US 6,751,350 B2

(12) United States Patent
Crinon et al.

(10) Patent No.: US 6,751,350 B2
(45) Date of Patent: Jun. 15, 2004

(54) MOSAIC GENERATION AND SPRITE-BASED CODING WITH AUTOMATIC FOREGROUND AND BACKGROUND SEPARATION

(75) Inventors: Regis J. Crinon, Camas, WA (US); Muhammed Ibrahim Sezan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/799,739

(22) Filed: Mar. 5, 2001

(65) Prior Publication Data

US 2002/0191846 A1 Dec. 19, 2002

Related U.S. Application Data

(63) Continuation of application No. 09/052,870, filed on Mar. 31, 1998, now Pat. No. 6,249,613.
(60) Provisional application No. 60/041,777, filed on Mar. 31, 1997.

(51) Int. Cl.7 .............................. G06K 9/00; G06K 9/36
(52) U.S. Cl. ....................... 382/173; 382/236; 382/238
(58) Field of Search ................................ 382/164, 170, 382/171, 173, 224, 227, 232, 233, 236, 238, 239, 284, 276, 294, 243; 348/586, 588, 564

(56) References Cited

U.S. PATENT DOCUMENTS

| 5,109,435 A | * | 4/1992 | Lo et al. .................... 382/103 |
| 5,327,262 A | | 7/1994 | Williams |
| 5,557,684 A | * | 9/1996 | Wang et al. ................ 382/236 |
| 5,631,975 A | * | 5/1997 | Riglet et al. ............... 382/173 |
| 5,649,032 A | * | 7/1997 | Burt et al. .................. 382/284 |
| 5,748,780 A | * | 5/1998 | Stolfo ........................ 382/232 |
| 5,764,803 A | * | 6/1998 | Jacquin et al. ............. 382/236 |
| 5,812,787 A | * | 9/1998 | Astle ......................... 382/236 |
| 5,854,856 A | * | 12/1998 | Moura et al. ............... 382/232 |
| 5,915,044 A | * | 6/1999 | Gardos et al. .............. 382/236 |
| 5,943,445 A | * | 8/1999 | Dufaux ...................... 382/236 |
| 5,974,172 A | * | 10/1999 | Chen ......................... 382/166 |
| 5,991,444 A | * | 11/1999 | Burt et al. .................. 382/232 |
| 5,999,662 A | * | 12/1999 | Burt et al. .................. 382/284 |
| 6,249,613 B1 | * | 6/2001 | Crinon et al. .............. 382/236 |

OTHER PUBLICATIONS

*Results of N3 Experiment Using Unified S2/N3 Syntax* by R. Crinon, D. Messing, I. Sezan, ISO/IEC JTC1/SC29/WG11 MPEG96/1404, Nov. 1996.
*Update Results Regarding N3 Core Experiment* by F. Dufaux and R. Crinon, ISO/IEC JTC1/SC29/WG11 MPEG97/1811, Feb. 1997.

(List continued on next page.)

Primary Examiner—Andrew W. Johns
Assistant Examiner—Amir Alavi
(74) *Attorney, Agent, or Firm*—Marger Johnson & McCollom, PC

(57) ABSTRACT

An automatic segmentation system distinguishes foreground and background objects by first encoding and decoding a first image at a first time reference. Macroblocks are extracted from a second image at a second time reference. The macroblocks are mapped to pixel arrays in the decoded first image. Frame residuals are derived that represent the difference between the macroblocks and the corresponding pixel arrays in the previously decoded image. A global vector representing camera motion between the first and second images is applied to the macroblocks in the second image. The global vectors map the macroblocks to a second pixel array in the first decoded image. Global residuals between the macroblocks and the second mapped image arrays in the first image are derived. When the global residuals are compared with the frame residuals to determine which macroblocks are classified as background and foreground. The macroblocks classified as foreground are then blended into a mosaic.

14 Claims, 11 Drawing Sheets

OTHER PUBLICATIONS

*A Layered Video Object Coding System Using Sprite and Affine Motion Model* by Ming–Chieh Lee, Wei–ge Chen, Chih–lung Bruce Lin, Chuang Gu, Tomislav Markoc, Steven I. Zabinsky and Richard Szeliski, *IEEE Transactions on Circuits and Systems for Video Technology,* vol. 7, No. 1, Feb. 1997, pp. 130–144.

World Intellectual Property Organization International Bureau International Application Published Under the Patent Cooperation Treaty, International Publication No. WO 96/15508 dated May 23, 1996.

World Intellectual Property Organization International Bureau International Application Published Under the Patent Cooperation Treaty, International Publication No. WO 98/29834 dated Jul. 9, 1998.

*Video Compression Using Mosaic Representations* by Michal Irani, Steve Hsu, P. Anandan, David Sarnoff Research Center, *Signal Processing Image Communication* 7(1995) Nov., No. 4/6, pp. 529–552.

*Background Mosaicking for Low Bit Rate Video Coding* by Frederic Dufaux and Fabrice Moscheni, 1996 *IEEE,* pp. 673–676.

*Evaluation of a Mosiac Based Approach to Video Compression* by Bruce Tannebaum, Rajesh Suryadevara and Steve Hsu, David Sarnoff Research Center, 1996 *IEEE,* pp. 1213–1215.

*Results for Video Coding Using Dynamic Sprite* (Core Experiment N3) by F. Dufaux, ISO/IEC JTC1/SC29/WG11 MPEG96/1458, Nov. 1996.

\* cited by examiner

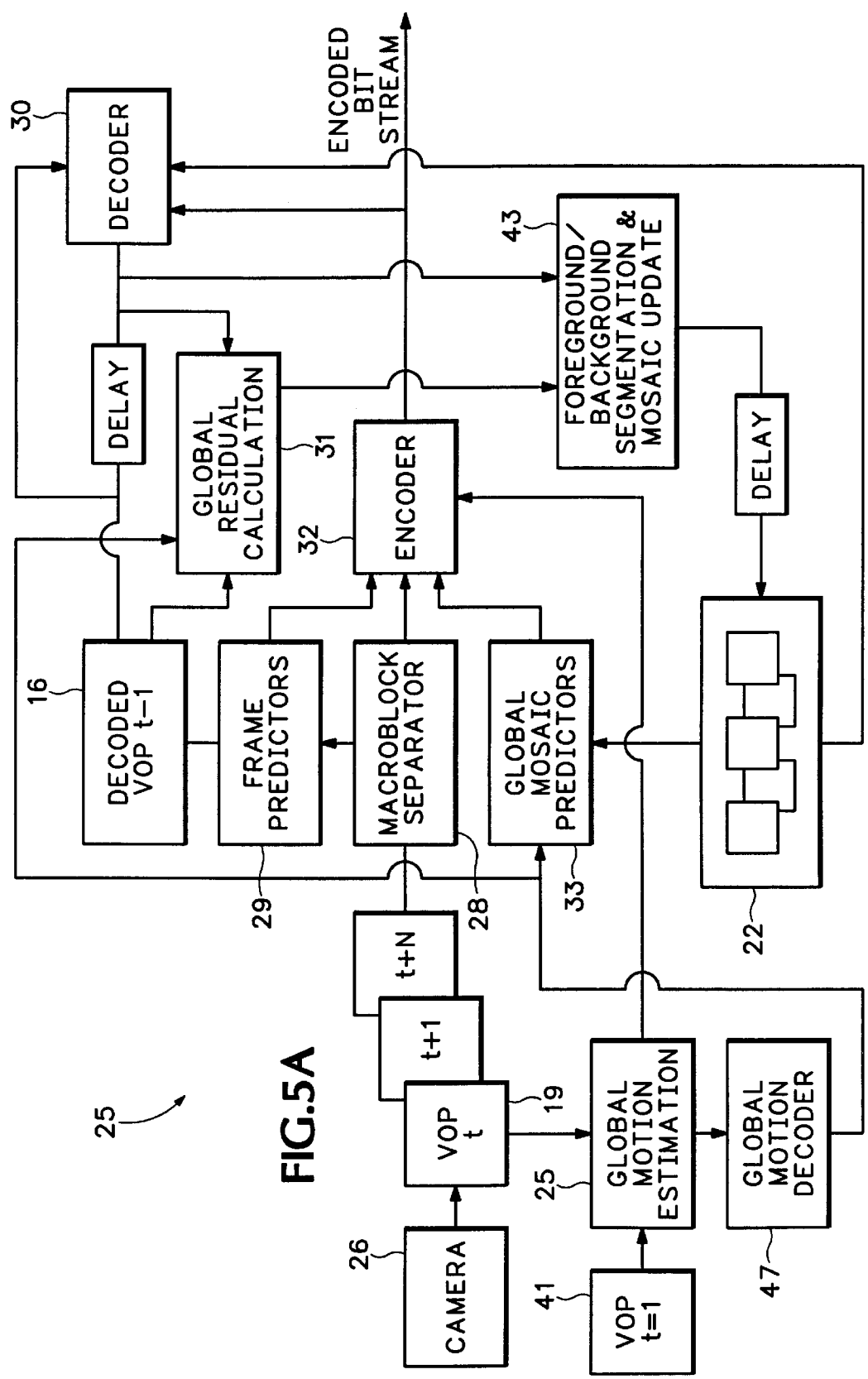

MOSAIC GENERATION AND SPRITE-BASED CODING WITH AUTOMATIC FOREGROUND AND BACKGROUND SEPARATION

This application is a continuation of Ser. No. 09/052,870 filed Mar. 31, 1998, U.S. Pat. No. 6,249,613 which claims benefit of Provisional Application 60/041,777 filed Mar. 31, 1997.

BACKGROUND OF THE INVENTION

This invention relates to mosaic generation and sprite-based coding, and more particularly, to sprite-based coding with automatic foreground and background segmentation. Throughout the document, the terms "sprite" and "mosaic" will be used interchangeably.

Dynamic sprite-based coding can use object shape information to distinguish objects moving with respect to the dominant motion in the image from the rest of the objects in the image. Object segmentation may or may not be available before the video is encoded. Results of sprite-based coding with a priori object segmentation increases coding efficiency at sufficiently high bit rates where segmentation information, via shape coding, can be transmitted.

When object segmentation is available and transmitted, sprite reconstruction uses the dominant motion of an object (typically, a background object) in every video frame to initialize and update the content of the sprite in the encoder and decoder. Coding efficiency improvements come from scene re-visitation, uncovering of background, and global motion estimation. Coding gains also come from smaller transmitted residuals as global motion parameters offer better prediction than local motion vectors in background areas. Less data is transmitted when a scene in revisited or background is uncovered because the uncovered object texture has already been observed and has already been incorporated into the mosaic sometime in the past. The encoder selects the mosaic content to predict uncovered background regions or other re-visited areas. Coding gains come from the bits saved in not having to transmit local motion vectors for sprite predicted macroblocks.

However, the segmentation information may not be available beforehand. Even when available, it may not be possible to transmit segmentation information when the communication channel operates at low bit rates. Shape information is frequently not available since only a small amount of video material is produced with blue screen overlay modes. In these situations, it is not possible to distinguish among the various objects in each video frame. Reconstruction of a sprite from a sequence of frames made of several video objects becomes less meaningful when each object in the sequence exhibits distinct motion dynamics. However, it is desirable to use dynamic sprite-based coding to take advantage of the coding efficiency at high bit rates and if possible, extend its performance at low bit rates as well. Shape information takes a relatively larger portion of the bandwidth at low bit rate. Thus, automatic segmentation provides a relatively larger improvement in coding efficiency at low bit rates.

Current sprite-based coding in MPEG-4 assumes that object segmentation is provided. With the help of segmentation maps, foreground objects are excluded from the process of building a background panoramic image. However, the disadvantage of this approach is that object segmentation must be performed beforehand. Object segmentation is a complex task and typically requires both spatial and temporal processing of the video to get reliable results.

Temporal linear or non-linear filtering is described in U.S. Pat. No. 5,109,435, issued Apr. 28, 1992, entitled Segmentation Method for Use Against Moving Objects to Lo, et al. Temporal filtering is used for segmenting foreground objects from background objects for the purpose of reconstructing image mosaics. This approach has two disadvantages: First, it requires that several frames be pre-acquired and stored so temporal filtering can be performed. Second, it does not explicitly produce a segmentation map, which can be used to refine motion estimates.

Analysis of motion residuals is described in U.S. Pat. No. 5,649,032, issued Jul. 15, 1997, entitled System for Automatically Aligning Images to Form a Mosaic Image, to Burt, et al. This method separates foreground objects from background objects in a mosaic but does not reconstruct a mosaic representative of the background object only (see description in the Real time transmission section). Post-processing must be used to eliminate the foreground objects.

Accordingly, a need remains for automatically performing on-line segmentation and sprite building of a background image (object undergoing dominant motion) when prior segmentation information is neither available nor used due to bandwidth limitations.

SUMMARY OF THE INVENTION

Automatic object segmentation generates high quality mosaic (panoramic) images and operates with the assumption that each of the objects present in the video scene exhibits dynamical modes which are distinct from the global motion induced by the camera. Image segmentation, generation of a background mosaic and coding are all intricately linked. Image segmentation is progressively achieved in time and based on the quality of prediction signal produced by the background mosaic. Consequently, object segmentation is embedded in the coder/decoder (codec) as opposed to being a separate pre or post-processing module, reducing the overall complexity and memory requirements of the system.

In the encoder, foreground and background objects are segmented by first encoding and decoding a first image at a first time reference. The method used to encode and decode this first image does not need to be specified for the purpose of this invention. The second image at a second time reference is divided into non-overlapping macroblocks (tiles). The macroblocks are matched to image sample arrays in the decoded first image or in the mosaic. In the first case, the encoder uses local motion vectors to align an individual macroblock with one or several corresponding image sample array in the previous decoded image. In the second case, the encoder uses parameters of a global motion model to align an individual macroblock with a corresponding mosaic sample array. The encoder evaluates the various residuals and selects the proper prediction signal to use according to a pre-specified policy. This decision is captured in the macroblock type. The macroblock types, the global motion parameters, the local motion vectors and the residual signals are transmitted to the decoder.

Frame residuals represent the difference between the macroblocks and corresponding image arrays in the previously decoded image matched by using local motion vectors. Macroblocks having a single local motion vector are identified as INTER1V-type macroblocks. Macroblocks having multiple (4) local motion vectors are identified as INTER4V-type macroblocks. INTER4V macroblocks are always labeled as foreground. INTER1V macroblocks can either be labeled foreground or background.

A global motion model representing camera motion between the first and second image is applied to the macroblocks in the second image. The global vector maps the macroblocks to a corresponding second image sample array in the first decoded image. Global residuals between the macroblocks and the second image array are derived. When the global residuals are greater than the INTER1V frame residuals, the macroblocks are classified as foreground. When the INTER1V frame residuals are greater than the global residuals, the macroblocks are classified as background. By comparing the global residuals to the INTER1V frame residuals derived from the previously decoded image the mosaic can be automatically updated with the image content of macroblocks likely to be background.

Mosaic residuals represent the difference between the macroblocks and corresponding global motion compensated mosaic arrays. Any macroblocks tagged as mosaic prediction type are classified as background.

A segmentation map can be used to classify the macroblocks as either foreground or background. A smoothing process is applied to the segmentation map to make foreground and background regions more homogeneous. The mosaic is then updated with the contents of macroblocks identified as background in the smoothed segmentation map.

Automatic segmentation does not require any additional frame storage and works in a coding and in a non-coding environment. In a non-coding environment, the invention operates as an automatic segmentation-based mosaic image reconstruction encoder. Automatic object segmentation builds a mosaic for an object exhibiting the most dominant motion in the video sequence by isolating the object from the others in the video sequence and reconstructing a sprite for that object only. The sprite becomes more useable since it is related to only one object. The results of the auto-segmentation can be used to obtain more accurate estimates of the dominant motion and prevent the motion of other objects in the video sequence from interfering with the dominant motion estimation process.

Automatic object segmentation can be integrated into any block-based codec, in particular, into MPEG4 and is based on macroblock types and motion compensated residuals. Dominant motion compensation is used with respect to the most recently decoded VO plane. A spatial coherency constraint is enforced to maintain the uniformity of segmentation. Automatic segmentation is used in a non-coding environment, for example in the context of building a background image mosaic only (or region undergoing dominant motion) in the existence of foreground objects. Thus, automatic sprite-based segmentation is not only useful for on-line dynamic sprites but can also be used in generating an off-line (e.g., background) sprite that can be subsequently used in static sprite coding.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 9 is a segmentation map and smoothed segmentation map according to another feature of the invention.

DETAILED DESCRIPTION

Figure 1:
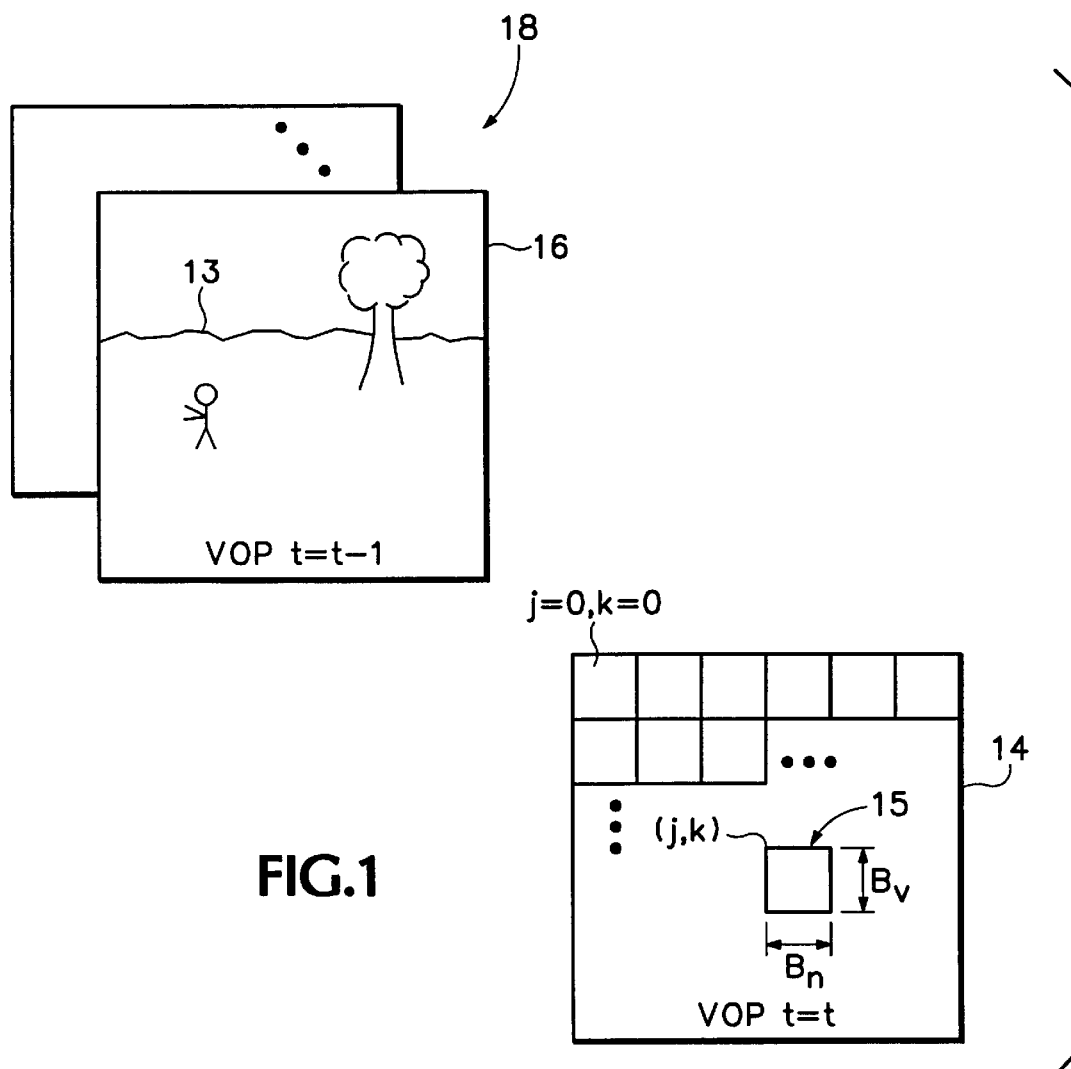
FIG. 1 is a diagram of an image frame divided into multiple macroblocks.

Referring to FIG. 1, automatic segmentation extracts a background object 13, such as a hillside or a tree, from a sequence of rectangular-shaped video object planes (VOPs) 18. The VOPs 18 are alternatively referred to as frames or image frames. It is assumed that a previous decoded VOP 16 is available at time t–1. A current VOP 14 is available at time t. Terms used to describe automatic segmentation according to the invention is defined as follows.

(j,k): Position of a macroblock 15 in the Video Object Plane (VOP) 14 currently being encoded. The coordinates (j,k) represent the upper left corner of the macroblock 15. The size of a macroblock is $B_h \times B_v$ pixels, where $B_h$ is the horizontal dimension and $B_v$ is the vertical dimension of the macroblock, respectively.

MBType(j,k): Macroblock type. This quantity takes the value INTRA, INTER1V (one motion vector for the whole macroblock), INTER4V (four motion vectors for each of the 8×8 blocks in the macroblock), MOSAIC, SKIP and TRANSPARENT. The INTRA macroblock type corresponds to no prediction from the previous VOP 16 because there are no good matches between the macroblock 15 and any encoded/decoded 16×16 pixel image in VOP 16. INTRA macroblocks typically occur when new image areas appear in VOP 14 that cannot be predicted. Instead of encoding the differences between macroblock 15 and the best matched 16×16 pixel image in VOP 16, the macroblock 15 is encoded by itself. (equivalent to using a prediction signal equal to 0)

Figure 2:
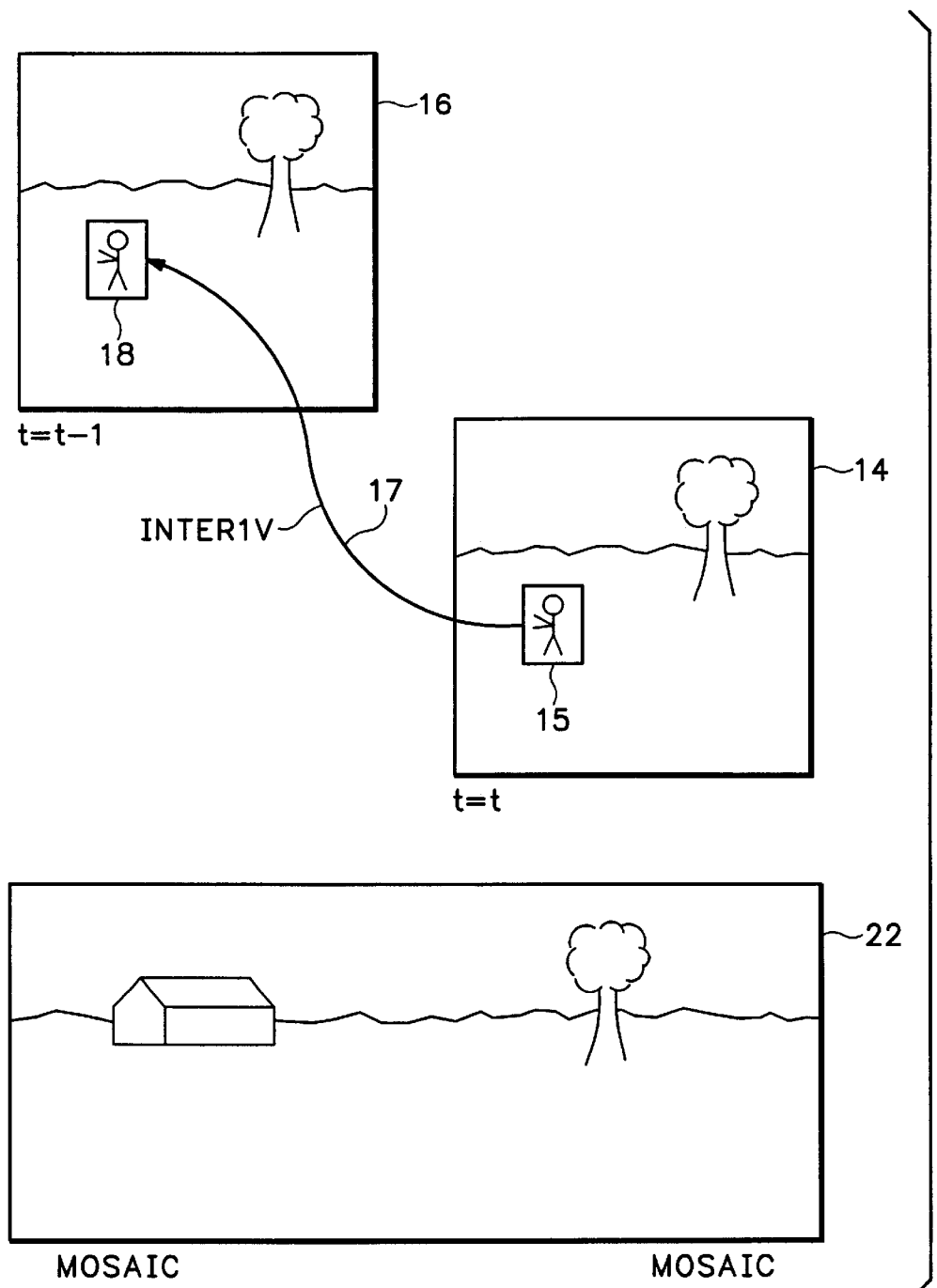
FIG. 2 is a diagram showing an INTER1V prediction mode.

Referring to FIG. 2, the INTER1V macroblock type corresponds to a prediction from the previous decoded VOP 16 at time t–1. In this case, a prediction signal is computed using one motion vector 17 to align the current macroblock 15 (j,k) with a 16×16 pixel array 18 in a previously encoded VOP 16. The motion vector is the pixel distance that macroblock 15 is shifted from the (j,k) position in VOP 14 to match up with a similar 16×16 pixel image in VOP 16. The prediction signal is obtained by applying a local motion vectors to the current macroblock 15 that map to the 16×16 pixel image in the previous VOP 16. To reduce the amount of data transmitted, only the macroblock motion vector and residual are transmitted instead of all pixel information in macroblock 15. Motion vectors move on either a pixel or subpixel resolution with respect to the previous VOP 16.

Figure 3:
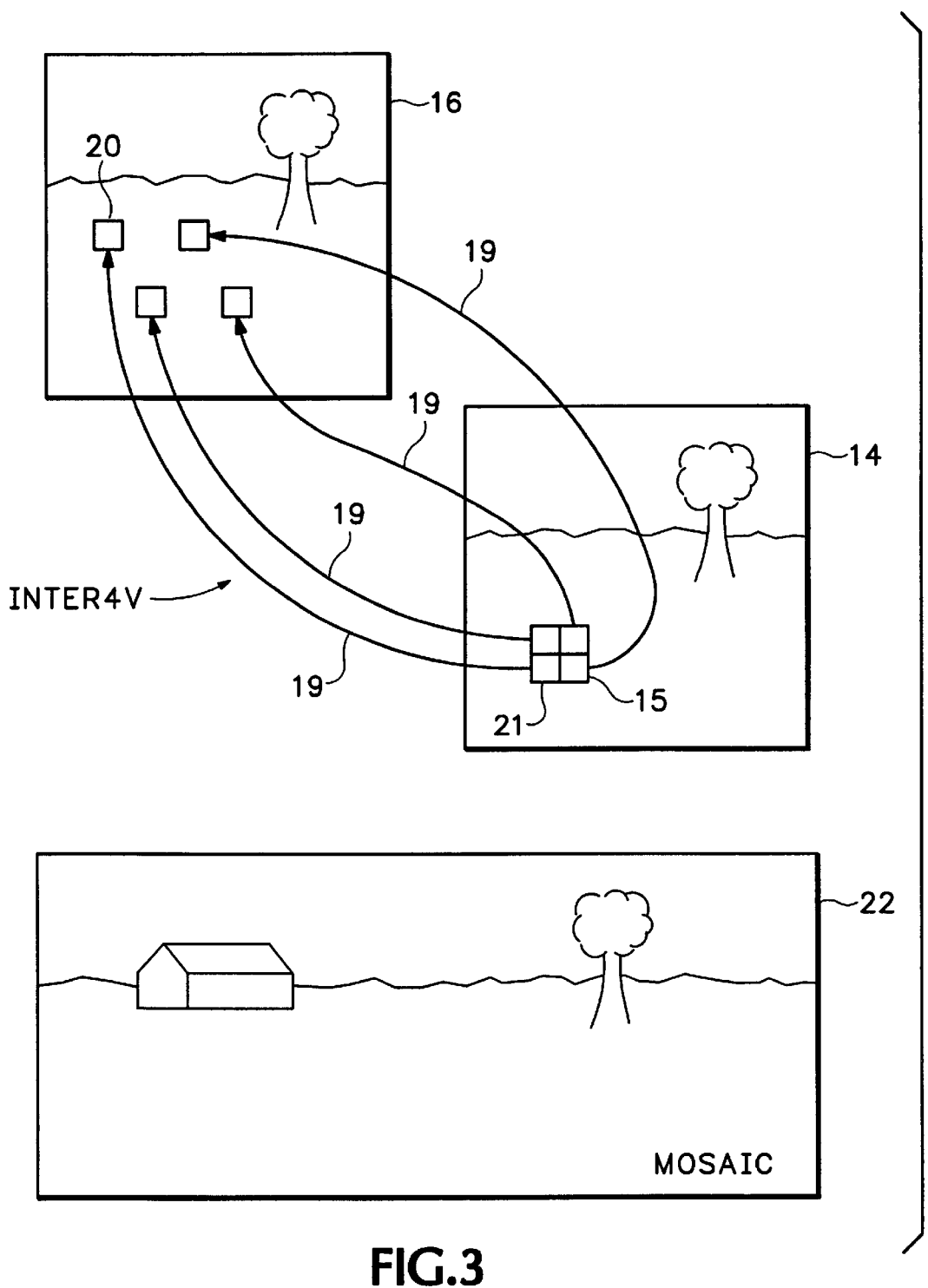
FIG. 3 is a diagram showing an INTER4V prediction mode.
Figure 4:
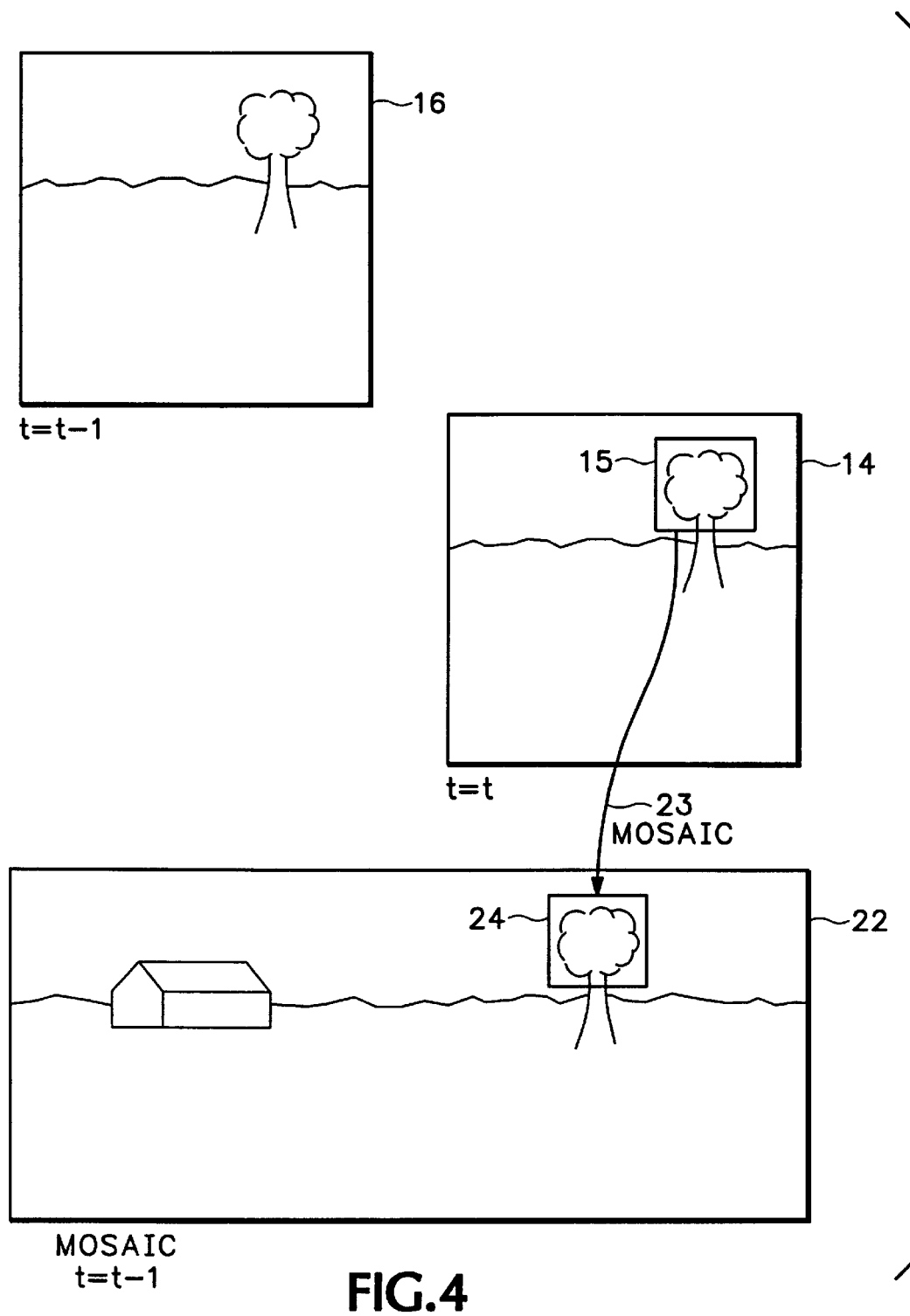
FIG. 4 is a diagram showing a MOSAIC prediction mode.

FIG. 3 shows the INTER4V macroblock type that corresponds to a prediction computed using four motion vectors 19. Each motion vector 19 aligns one sub-macroblock 21 with an 8×8 pixel array 20 in the previous VOP 16. FIG. 4, shows the MOSAIC macroblock type corresponding to a prediction made from the mosaic 22 updated last at time t–1. A global motion model aligns the current macroblock 15 with a 16×16 pixel array 24 in mosaic 22. The TRANSPARENT macroblock mode relates to object based encoding modes where a portion of an image is blocked out for insertion of subsequent object data. The SKIP macroblock mode is equivalent to MOSAIC macroblock mode for which mosaic residual signal is equal to 0.

The residuals generated from the global and various local motion models are compared. The macroblock is usually tagged as the macroblock type with the smallest residuals. However, the macroblock type selection could follow a different policy without affecting the invention described herein.

Define the various residuals that are used by this invention:

RES(j,k): The transmitted residual at the macroblock (j,k). This residual results from computing the difference between the predictor (reference) image in either the MOSAIC (MBType(j, k)=MOSAIC or SKIP) or the previous frame type from VOP 16 (MBType(j,k)=INTER1V, or INTER4V) and the data in the macroblock 15 depending on which macroblock type has been selected. The value of RES(j,k) is 0 if the macroblock is of type INTRA.

GMER(j,k): Global motion estimation residual. The residual at the macroblock (j,k) resulting from backward warping the current macro block and comparing it with the previously decoded VOP 16. The warping is done using the transmitted and decoded global motion parameters (i.e. from a Stationary, Translational model, an Affine model or a Perspective model). The global motion estimation residual is the difference between the macroblock 15 and the global motion compensated pixel array in the previous VOP 16. In other words, the GMER(j,k) is the difference between the macroblock 15 and a corresponding pixel array in the previous block 16 after removing the effects of camera rotation, zoom, perspective angle changes, etc. Global motion parameters are encoded and transmitted with each VOP 18. The calculation of GMER(j,k) is described in further detail in FIG. 8.

QP: The current value of the quantizer step used by the encoder to compress the texture residuals in the macroblock (j,k). θ( ): A pre-defined threshold value greater or equal to 1. This threshold value is a function of the quantizer step QP. $W_f$( ): Forward warping operator. $W_b$( ): Backward warping operator. w: Vector of warping parameters specifying the mappings $W_f$( ) and $W_b$( ). The vector w has zero, two, six or eight entries depending whether the warping is an identity, a translational, an affine or a perspective transformation, respectively. α: A pre-defined blending factor. Warping operators compensate an image for changes in camera perspective, such as rotation, zoom, etc. Implementation of warping operators is well known in the art and, therefore, is not described in further detail.

Figure 5B:
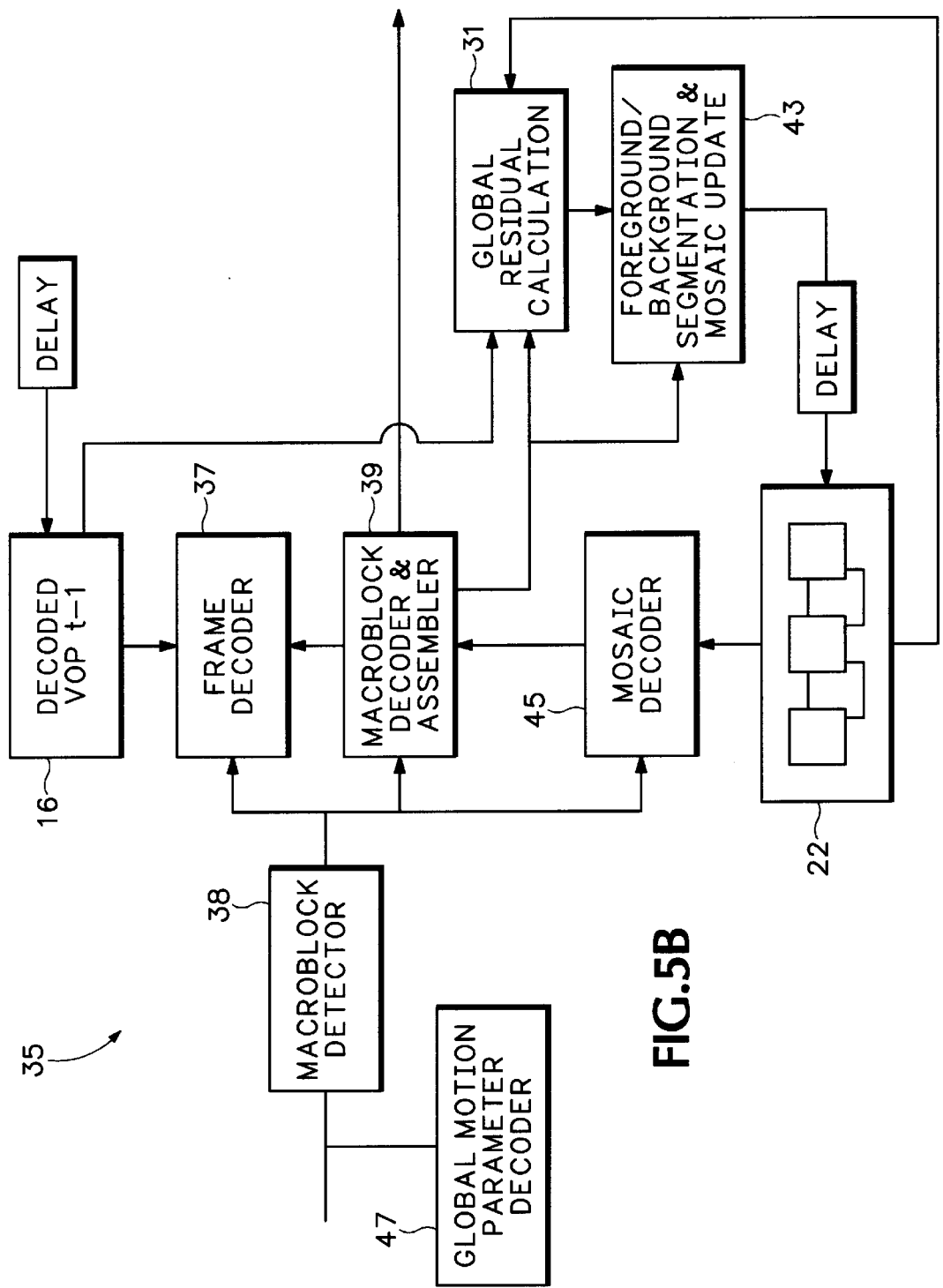
FIG. 5 is a block diagram of an automatic segmentation encoder and decoder according to the invention.

FIG. 5A shows functional blocks in an automatic segmentation encoder 25 and FIG. 5B shows functional blocks in an automatic segmentation decoder 35 according to the invention. A camera 26 generates VOPs 18 (see FIG. 1) and a macroblock separator 28 tiles the current VOP 14 into multiple macroblocks 15. A frame predictor 29 matches each individual macroblock 15 with pixel arrays in the previously encoded/decoded VOP frame 16 and generates frame (local) motion vectors and frame residuals associated with the macroblocks in the current VOP 14. Frame predictor 29 is used for assessing INTER1V and INTER4V prediction.

A mosaic predictor 33 matches the macroblocks 15 with pixel arrays in the mosaic 22 by using Global Motion Parameters calculated by Global Motion Estimation and Encoding Unit 27. Such parameters are estimated using original VOPs at time t and t−1 (41). The mosaic predictor 33 produces mosaic residuals associated with each macroblock 15. A global residual computation unit 31 matches the macroblocks with pixel arrays in the previously decoded VOP frame 16 according to frame global motion parameters and generates the global motion estimation residuals GMER (j,k). The global motion parameters are decoded by the decoder 47. An encoder 32 tags each macroblock as either TRANSPARENT or MOSAIC or SKIP or INTRA or INTER1V or INTER4V upon comparing the mosaic residual signal and the frame local residuals signals. Encoder 32 also inserts the global motion parameters in the encoded bit stream.

The INTER1V or INTER4V prediction types are alternatively referred to as FRAME prediction types. The foreground/background segmentation and mosaic update unit 43 classifies macroblocks tagged as INTER1V prediction type as foreground when the global motion estimation residuals GMER(j,k) are greater than a portion (specified by the value θ) of the INTER1V residuals RES(j,k). Otherwise, the INTER1V macroblocks are classified as background. INTER4V macroblocks are classified as foreground.

The MOSAIC and SKIP macroblocks are referred to as MOSAIC prediction types. These macroblocks are classified as background.

The INTRA macroblocks are classified as foreground.

The mosaic update unit 43 identifies the background and foreground macroblocks and blends the macroblocks classified as background into the mosaic 22. The encoder 32 can then transmit an encoded bit stream including the global motion parameters, the tagged macroblock prediction type, the motion vectors associated with the tagged macroblock prediction type (if the macroblock type demands it), and the residuals associated with the tagged macroblock prediction type. A decoder 30 decodes the encoded bit stream to generate the decoded previous frame 16.

The decoder 35 includes a macroblock detector 38 that reads the tagged macroblock prediction type in the transmitted bit stream transmitted by encoder 25. The bitstream data is directed to the relevant decoder depending on the macroblock type. A frame decoder 37 uses the received residuals and portions of the previous decoded VOP 16 to reconstruct INTER1V or INTER4V macroblocks. A mosaic decoder 45 uses the received residuals and portions of the mosaic 22 to reconstruct MOSAIC or SKIP macroblock types. The macroblock decoder and assembler 39 takes the output of the frame decoder or the mosaic decoder as appropriate. Neither of these two predictors is used for INTRA macroblocks and in this case decoder 39 decodes the INTRA macroblock. A global residual computation unit 31 receives the decoded global motion parameters associated with the current frame. These global motion parameters are decoded by unit 47.

The residual signal and macroblock type used by decoder 39 are also passed to the foreground/background segmentation and mosaic update unit 49 to classify the macroblocks as foreground or background. The output of the global residual computation unit 31 is also input to the mosaic update unit 49. The exact same rules are used as in the encoder to derive the foreground/background segmentation map. Specifically, decoded INTER1V prediction type macroblocks are classified as foreground when the global motion estimation residuals GMER(j,k) are greater than the portion of the INTER1V residual RES(j,k). Otherwise, the assembled macroblocks are classified as background. Decoded INTRA and INTER4V macroblock types are classified as foreground. MOSAIC and SKIP macroblocks are classified as background. The mosaic update unit 49 updates the mosaic 22 with assembled macroblocks classified as background.

Figure 6:
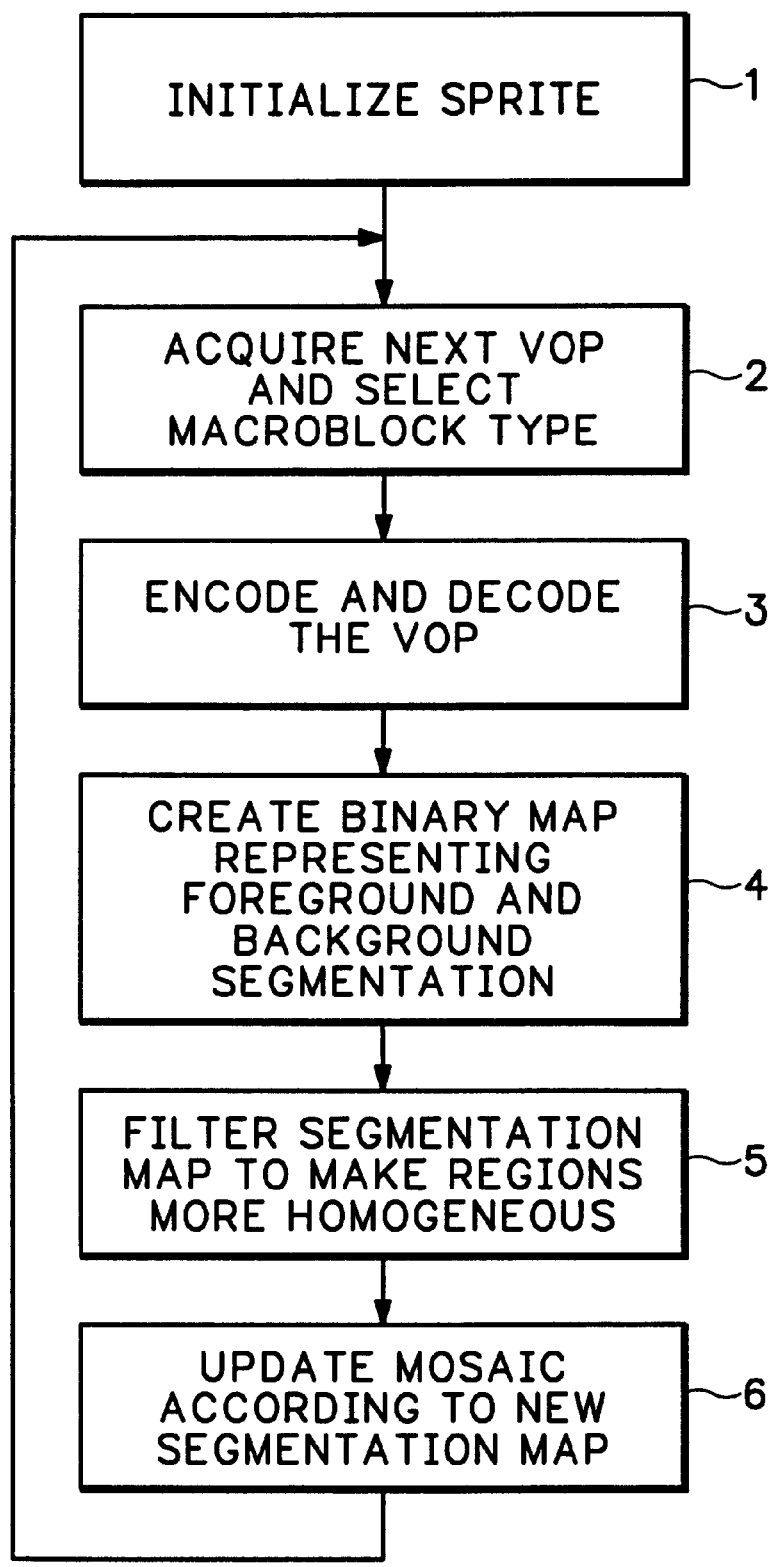
FIG. 6 is a step diagram showing how the automatic segmentation is performed according to the invention.

FIG. 6 describes the overall operation of the automatic segmentation encoder 25 according to the invention.
Step 1: Initialize Sprite $$S_t(R, t_0) = \begin{cases} VO_t(r, t_0) & \text{if } VO_s(r, t_0) = 1 \\ 0 & \text{otherwise} \end{cases}$$

$$S_s(R, t_0) = \begin{cases} 1 & \text{if } VO_s(r, t_0) = 1 \\ 0 & \text{otherwise} \end{cases}$$

where $S_s(\ )$, $S_t(\ )$, $VO_s(\ )$, $VO_t(\ )$ represent the sprite (mosaic) shape, the sprite texture, the decoded VOP shape (rectangular shaped VO here) and the decoded VOP texture fields, respectively. The sprite shape $S_s(\ )$ and the decoded VOP shape $VO_s(\ )$ are binary fields. In the sprite shape image, the value 0 means that the mosaic content is not determined and the value 1 means the mosaic content is determined at this location. In the decoded VO shape image, values 0 and 1 mean that the decoded VO is not defined and defined at this location, respectively. Position vectors R and r represent the pixel position in the sprite and in the VO, respectively.

The content of the mosaic 22 is initialized with the content of the first VOP 16. The shape of the sprite is initialized to 1 over a region corresponding to the rectangular shape of VOP 16. The value 1 indicates that texture content has been loaded at this location in the mosaic. Instead of dumping the first VOP 16 into mosaic 22, an alternative initialization process is to initialize the buffers $S_s(\ )$ and $S_t(\ )$ to 0 thereby delaying integration of VOP 14 content into the mosaic by one image. The benefit of such approach is to avoid taking foreground information in the first VOP to initialize the mosaic. The automatic segmentation mode discussed below is the implementation for any macroblock inserted into the mosaic 22.

Step 2: Acquire Next VOP (Time t) and Select Macroblock Type

The macroblocks 15 are backward warped $W_b(\ )$ and then matched with corresponding pixel arrays in mosaic 22. The difference between macroblock 15 and the mosaic 22 are the residuals for the MOSAIC macroblock type. The same backward mapping is used to record the residuals GEMR(j, k) obtained from the previous decoded VOP 16. The macroblock 15 is compared with similar sized pixel arrays in previous VOP 16. A macroblock local motion vector maps macroblock 15 to a pixel array in previous VOP 16 to derive INTER1V residuals. Four local motion vectors are used to derive residual values for the INTER4V macroblock type.

If the residual values for MOSAIC, INTER1V and INTER4V are all greater than a predefined threshold, the macroblock 15 is assigned to MBType(j,k)=INTRA. If one or more of the residual values are below the threshold value, the macroblock 15 is assigned to the MBType(j,k) with the smallest frame or mosaic residual. Note that other policies can be implemented to select the macroblock type without affecting the invention described herein.

Step 3: Encode and Decode the VOP

The encoder 25 encodes and decodes the VOP 14 at time (t). The bitstream representing the encoded VOP is transmitted to the decoder. The decoder 30 (FIG. 5A) decodes the encoded bitstream to generate the decoded VOP 14.

Step 4: Create Binary Map to Detect Macroblocks Belonging to Foreground

Figure 7:
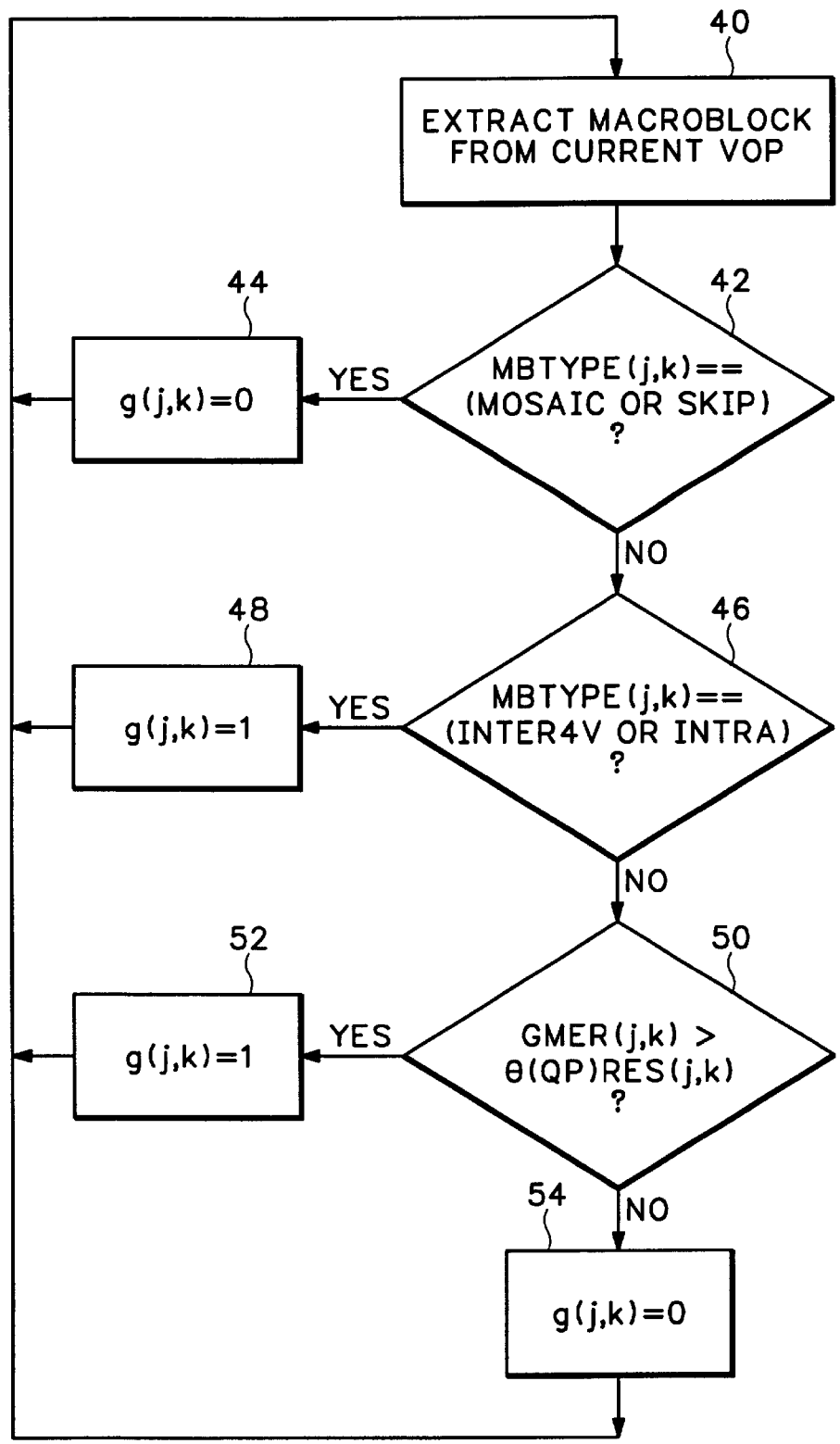
FIG. 7 is a step diagram showing how macroblocks in the image frame shown in FIG. 1 are classified as foreground and background according to the invention.
Figure 9:
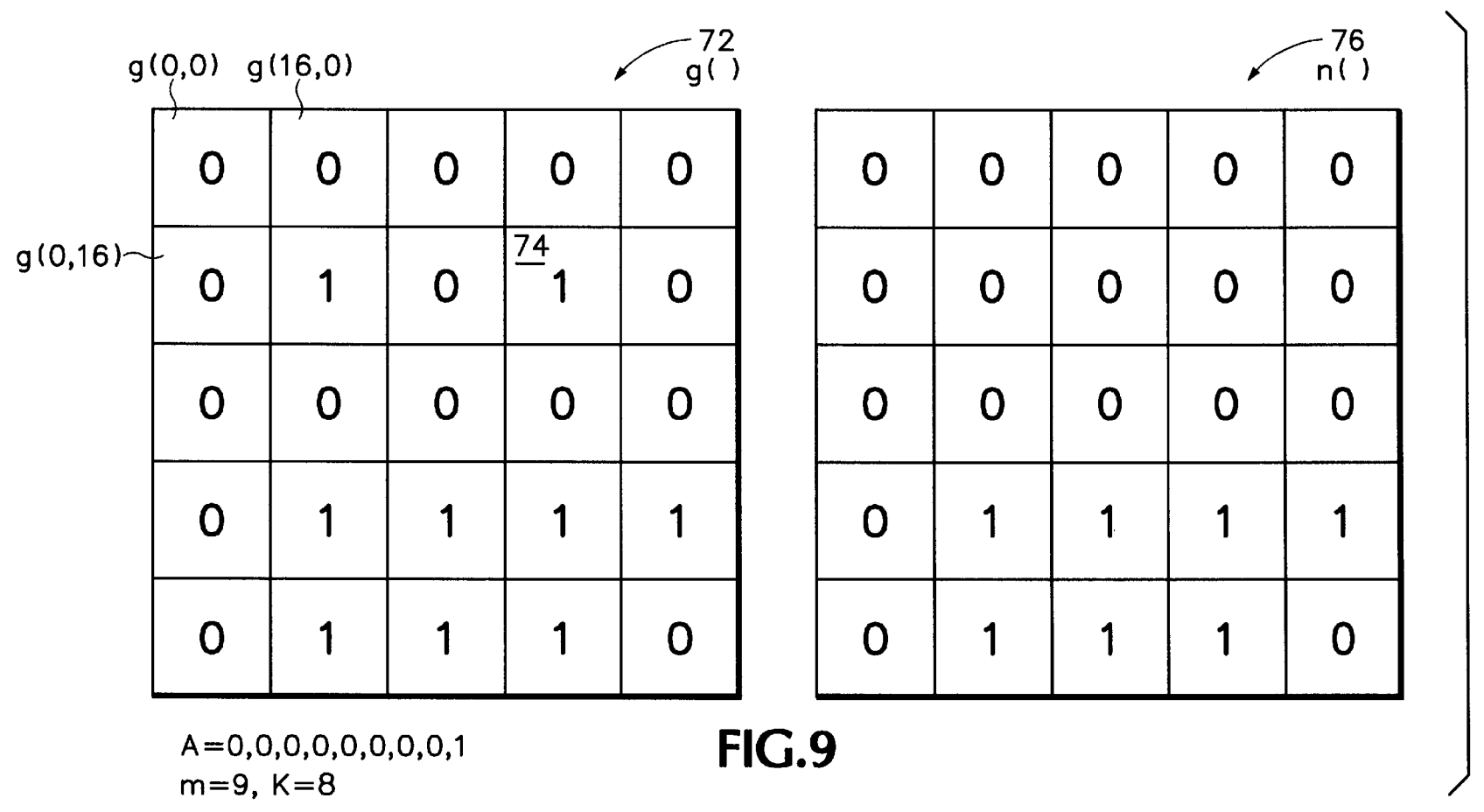

Referring to FIGS. 7 and 9, for every macroblock (j,k) in the current decoded rectangular-shaped VOP 14, an object segmentation map g(j,k) 72 is built. The encoder 25 extracts a macroblock from the current VOP 14 in step 40. Decision step 42 tests whether the macroblock is of type MOSAIC or SKIP. If the macroblock is of type MOSAIC or of a type SKIP, the segmentation map 72 is set to zero in step 44.

if((MBType(j,k)==MOSAIC)||(MBType(j,k)=SKIP)).

```
{
        g(j,k) = 0
}
```

If decision step 46 determines the macroblock is of type INTER4V or INTRA, the segmentation map is set to 1 in step 48.

else if(MBType(j,k)==INTER4V)

```
{
        g(j,k) = 1
}
```

If the macroblock is not of types MOSAIC, INTER4V, INTRA or SKIP, the global motion estimation residual (obtained from applying the global motion parameters between the decoded VOP at time t and the decoded VOP at time t−1) is compared against the residual from the INTER1V macroblock type in decision step 50. If the global motion estimation residual is greater than some portion of the INTER1V residual (set by θ(QP)), the corresponding macroblock in segmentation map 72 is set to 1 in step 52. If the Global Motion Estimation Residual is not greater, the segmentation map is set to 0 in step 54.

```
if( GMER(j,k)>θ(QP)RES(j,k) )
{
        g(j,k) = 1
}
else
{
        g(j,k) = 0
}
```

The binary segmentation map 72 g(j,k) represents initial foreground/background segmentation. Detected foreground texture is denoted by setting g(j,k)=1. This is the case whenever the INTER4V macroblock occurs since it corresponds to the situation where there are four distinct and local motion vectors. In other words, the four different motion vectors indicate that the image in the macroblock is not background. INTRA macroblocks are also considered foreground (g(j,k)=1) because the macroblock cannot be predicted from the previous decoded VOP or the mosaic. INTER1V are tagged as foreground when global motion estimation residual GMER(j,k) is larger than the portion of the (transmitted) INTER1V residual RES(j,k). In this situation, the global motion model does not correspond to the local dynamics of the foreground object.

Figure 8:
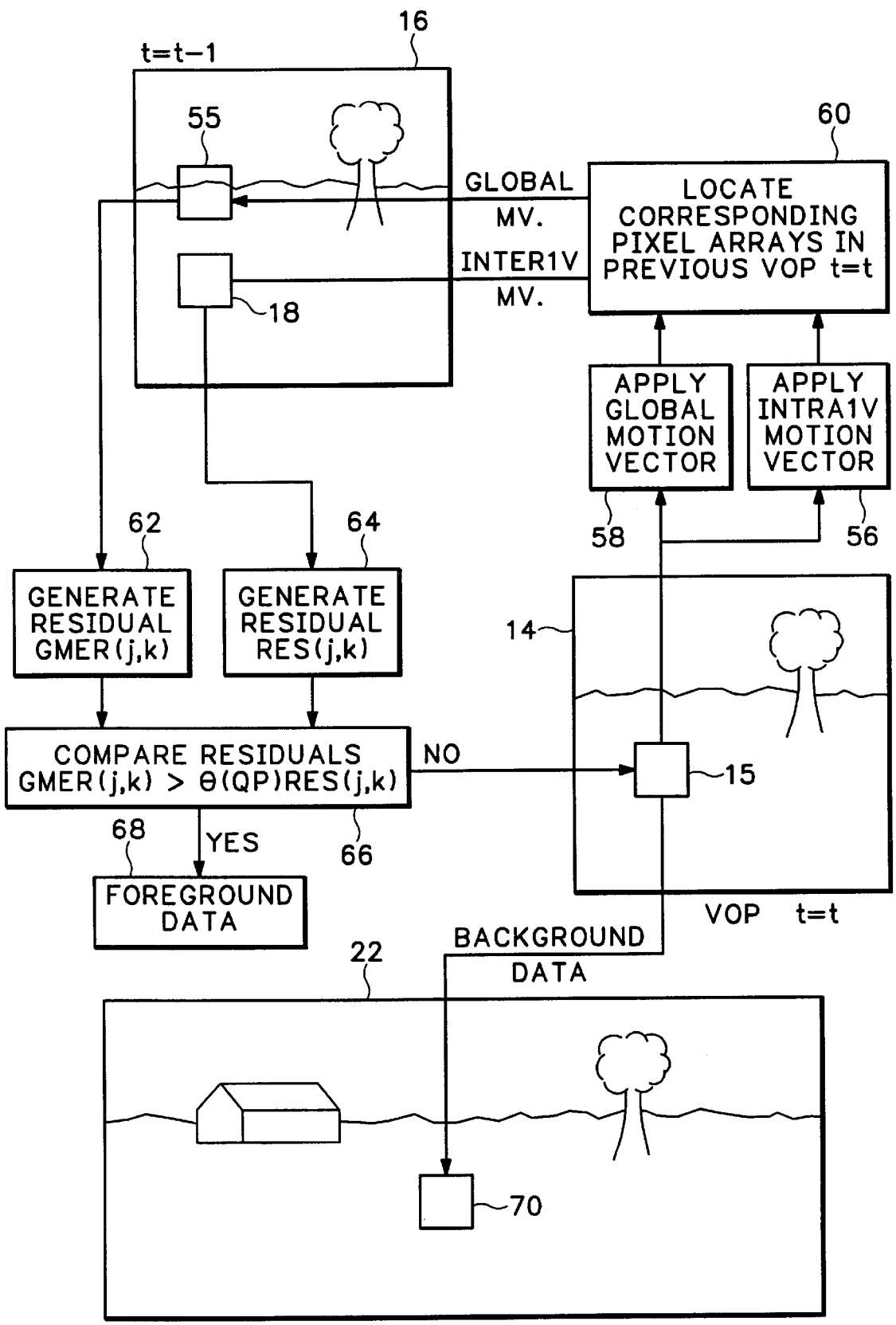
FIG. 8 is a schematic representation showing how the macroblocks are classified as foreground and background.

FIG. 8 explains in further detail how the encoder 25 (FIG. 5A) distinguishes background from foreground in the INTER1V macroblocks. The macroblock 15 in VOP 14 is determined by the encoder 25 to be of type INTER1V. Although macroblock 15 is encoded as INTER1V type, it is not conclusive whether the INTER1V type was used because macroblock 15 contains a foreground image or because the mosaic 22 is either corrupted with foreground content or has not completely incorporated that portion of background image contained in macroblock 15.

The global motion parameters for VOP 14 are applied to macroblock 15 in box 58. The INTER1V local motion vector is applied to macroblock 15 in block 56. A pixel array 55 corresponding to the global motion vector is compared to the macroblock 15 to generate the global motion estimation residual GMER(j,k) in block 62. The pixel array 18 corresponding to the INTER1V local motion vector is compared to the macroblock 15 generating the INTER1V residual RES(j,k) in block 64. The global motion estimation residual GMER(j,k) and the INTER1V residual RES(j,k) are compared in block 66.

If the global residual GMER(j,k) is greater than some portion of the INTER1V residual RES(j,k), the image in the macroblock 15 has its own motion and does not correspond to the global motion induced by panning, zooming, etc. of the camera. Accordingly, the image in macroblock 15 is tagged as foreground in block 68. Conversely, when the INTER1V residual RES(j,k) is greater than the global residual GMER(j,k), the image in the macroblock 15 tagged as background because it is likely to be new content in the background or a better representation of the background than what is currently in the mosaic 22. The macroblocks 15 tagged as background are inserted into the mosaic 22.

Step 5: Process Segmentation Map to Make Regions More Homogeneous

Step 5 (FIG. 6) removes any isolated 1s or 0s in the binary segmentation map 72 g( ) by using a two-dimensional separable or non-separable rank filter. The filter uses a neighborhood of macroblocks Q around a macroblock 74 of interest at location (j,k). M specifies the number of macroblocks in this neighborhood. The values of the segmentation map g( ) for each of the macroblocks belonging to the neighborhood Ω are ranked in increasing order in an array A with M entries.

Since g( ) can only take the value 0 or 1, A is an array of M bits where there are K zeros followed by (M-K) ones, K being the number of times the map g( ) takes the value 0 in the neighborhood Ω. Given a pre-fixed rank $\rho$, $1 \leq \rho \leq M$, the output of the filter is selected as the $\rho$th entry in the array A, that is $A[\rho]$. The output of the filter at each macroblock location (j,k) is used to generate a second segmentation map h( ), such that $h(j,k)=A[\rho]$. The result of applying the filter to the segmentation map go is removal of spurious 1's or 0's in the initial segmentation, thereby making it more spatially homogeneous. If the filter is separable, the filtering operation above repeated along each dimension (horizontally then vertically or vice versa). At the end of the first pass, the output map h( ) is copied to the map g( ) before the second pass is started.

Referring to FIG. 9, the number M of macroblocks in the neighborhood is 9. For the target macroblock 74, the array A has 9 entries with 8 zeros in macroblocks g(32,0), g(48,0), g(64,0), g(32,16), g(64,16), g(32,32), g(48,32) and g(64,32) followed by a 1 at macroblock g(48,16) (assuming a macroblock size of 16 pixels vertically and horizontally). Prefixed rank $\rho$ is set at 7 and the output of the filter at the 7th entry in the array A is 0. The filtered output of the macroblock 74 is, therefore, zero. A second filtered segmentation map 76 is generated from the filtered segmentation map 72.

Step 6: Update Mosaic According to New Segmentation Map

Figure 10:
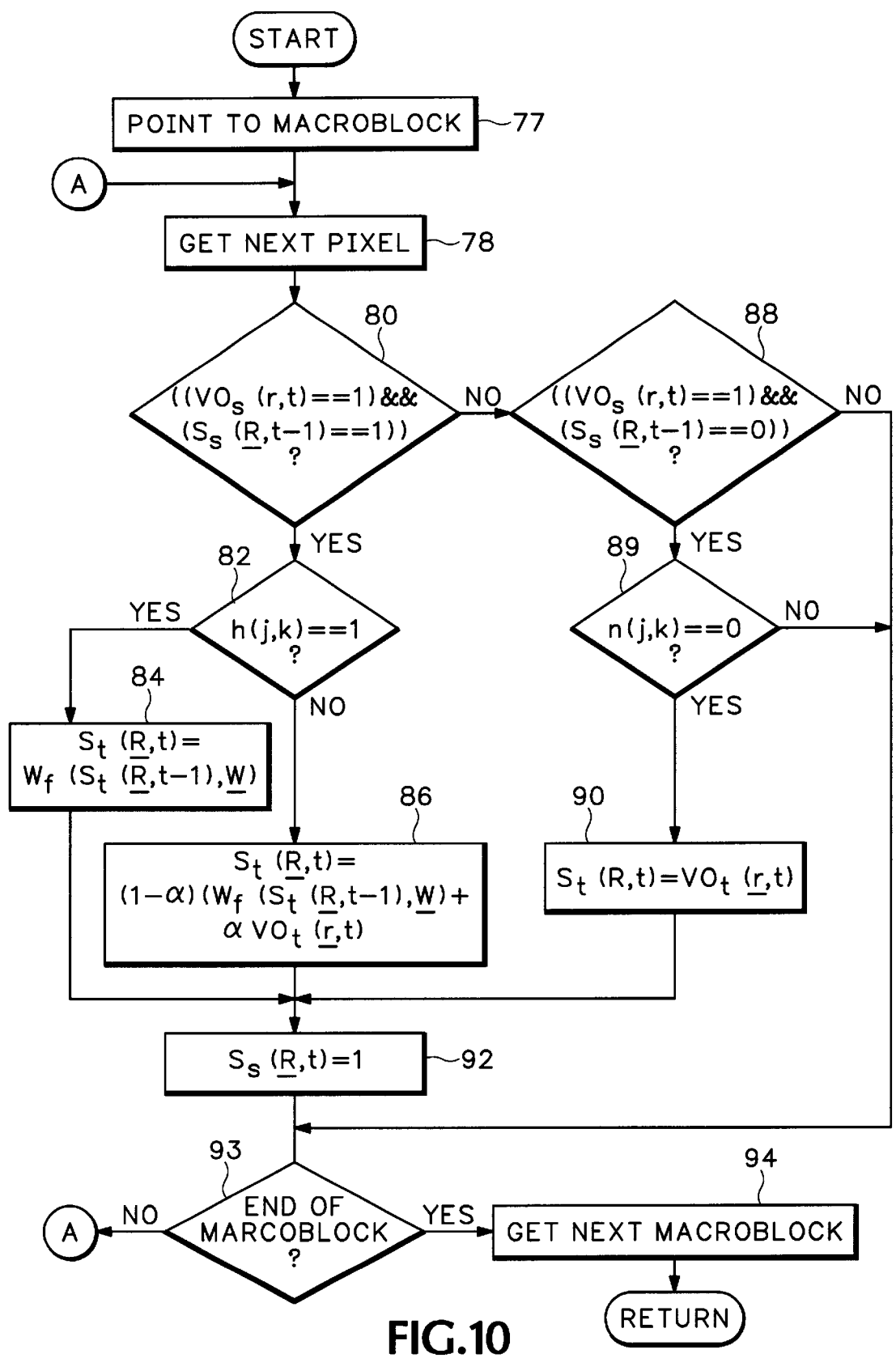
FIG. 10 is a step diagram showing how pixels in background macroblocks are blended into a mosaic.

Referring to FIG. 10, for every macroblock ((j,k) in the current VOP 14 at time (t), the mosaic 22 is updated as follows. First, the mosaic shape at time t, $S_s(R,t)$, is equal to 0 everywhere. Next, given a macroblock position (j,k), let $$r = \begin{bmatrix} j+l \\ k+p \end{bmatrix}$$

where the variables l and p are such that $0 \leq l \leq B_h-1$ and $0 \leq p \leq B_v-1$. The variables j+l and k+p are used to denote the position of each pixel within the macroblock (j,k).

The first macroblock is referenced in step 77 and the first pixel in the macroblock is retrieved in step 78. For every value l and p in the range specified above the following operation is performed. The pixels in the macroblock 15 are tested in step 80 to determine whether the pixel belongs to the decoded VOP 16 and whether mosaic content at this pixel location is already determined.

```
if( (VO_s(r,t)==1)&&(S_s(R,t - 1)==1) )
{
```

Decision step 82 determines whether the macroblock 15 is classified as a foreground macroblock. If the pixel in macroblock 15 is tagged as foreground, the corresponding pixel array in mosaic 22 is warped forward in step 84 but its contents are not changed.

```
if( h(j,k) == 1 )
{
    S_t(R,t)= W_f(S_t,(R,t - 1),w)
}
```

If the macroblock is tagged as background, the mosaic is forward warped and updated by blending the current content of VOP 14 in step 86.

```
{
    S_t(R,t)=(1-α)W_f(S_t(R,t-1),w) + α VO_t(r,t)
}
``` where α specifies the blending factor. The shape of the mosaic is set to 1 in step 92 to signal that mosaic content at that location has been determined.

```
    S_s(R,t)=1
}
```

If the macroblock pixel belongs to the VOP 16, the content of the mosaic 22 is undetermined (88), and the macroblock is classified as background (89) the content of the mosaic is set to the content of the current pixel in the VOP 14 in step 90 and the mosaic shape is set to 1 in step 92.

```
else if( (VO_s (r,t)==1)& &(S_s(R,t - 1)==0))
{
    if(h(j,k) == 0 ){
        S_t(R,t)= VO_t(r,t)
        S_s(R,t)=1
    }
}
```

After all pixels in the current macroblock 15 have been processed in decision step 93, step 94 gets the next macroblock. Otherwise, the next pixel is retrieved in step 78 and the process described above is repeated.

Step 7: Acquire Next VOP

The encoder 26 goes back to step 2 (FIG. 6) to start the same procedure for the next VOP at time t=t+1.

Automatic Segmentation in a Non-Coding Environment

The automatic segmentation described above can also be used in a non-coding environment. In this case, the macroblock sizes $B_h$ and $B_v$ are no longer imposed by the video coder 26 and are adjusted based on other criteria such as image resolution and object shape complexity. In this case, block-based image processing provides increased robustness in the segmentation by preventing spurious local motion modes to be interpreted as global motion of the background object. Furthermore, the value of the threshold $\theta(\ )$ is no longer a function of a quantizer step but instead becomes a function of the noise level in the video The automatic segmentation for on-line sprite-based coding is used in MPEG-4 codecs supporting on-line sprite prediction. It can also be used in digital cameras and camcorders to generate panoramic images. These panoramic images can be used to enhance consumer viewing experience (with or without foreground objects) and can also be used as representative images in a consumer video database (to summarize a video segment that includes camera panning, for example). It can be used as a basis for an image resolution enhancement system in digital cameras as well. In this case, a warping operation is designed to include a zooming parameter that matches the desired final resolution of the mosaic.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for automatically segmenting foreground and background objects in images, comprising:

receiving a first image associated with a first time reference;

extracting macroblocks from a second image associated with a second time reference;

mapping the macroblocks with corresponding arrays in the first image according to macroblock local vectors;

deriving frame residuals between the macroblocks and the corresponding arrays in the first image;

identifying the macroblocks as different frame prediction types according to particular types of local vectors used for mapping the macroblocks to the first image;

deriving multiple local motion vectors mapping different subportions of the macroblocks to subimage arrays in the first image;

deriving residuals by comparing the subportions of the macroblocks with the mapped subimage arrays;

identifying macroblocks as a submacroblock prediction types according to the derived residuals of the subportions of the macroblocks; and classifying the submacroblock prediction type macroblocks as foreground.

2. A method for automatically segmenting foreground and background objects in images, comprising:

receiving a first image associated with a first time reference;

extracting macroblocks from a second image associated with a second time reference;

mapping the macroblocks with corresponding arrays in the first image according to macroblock local vectors;

deriving frame residuals between the macroblocks and the corresponding arrays in the first image; and identifying the macroblocks as different frame prediction types according to particular types of local vectors used for mapping the macroblocks to the first image;

mapping macroblocks to portions of the first image according to global motion vectors;

deriving global residuals between the macroblocks and the mapped portions in the first image; and classifying the macroblocks as foreground or background by comparing the global residuals with the frame residuals.

3. A method according to claim 2 including transmitting an encoded bit stream that includes the identified prediction types of the macroblocks, local motion vectors and global motion vectors mapping, and the residuals for the identified prediction types.

4. An encoder, comprising:

a processor generating frame residuals by using local motion vectors to compare macroblocks in a first frame with pixel arrays in a second frame, generating global residuals by using global motion parameters to compare the macroblocks in the first frame with the pixel arrays in the second frame, and generating mosaic residuals by using the global motion parameters to compare the macroblocks in the first frame with pixel arrays in a mosaic, the processor identifying the macroblocks as mosaic prediction type when the mosaic residuals are used for encoding the macroblocks and as frame prediction type when the frame residuals are used for encoding the macroblocks, the processor classifying the frame prediction type macroblocks as foreground or background by comparing the global residuals with the frame residuals and classifying the mosaic prediction type as background.

5. The encoder according to claim 4 wherein the processor blends the macroblocks classified as background into the mosaic.

6. The encoder according to claim 4 wherein the processor transmits an encoded bit stream including the identified macroblock prediction type, the motion vectors associated with the identified macroblock prediction type, and the residuals associated with the identified macroblock prediction type.

7. The encoder according to claim 4 wherein the processor identifies the macroblocks as different frame prediction types according to particular types of local vectors used for mapping the macroblocks to the first frame.

8. The encoder according to claim 4 wherein the processor identifies macroblocks as foreground that are mapped to the first frame with multiple local motion vectors.

9. A method for encoding an image, comprising:

generating frame residuals by using local motion vectors to compare macroblocks in a first frame with pixel arrays in a second frame;

generating global residuals by using global motion parameters to compare the macroblocks in the first frame with the pixel arrays in the second frame;

generating mosaic residuals by using the global motion parameters to compare the macroblocks in the first frame with pixel arrays in a mosaic; and identifying the macroblocks as mosaic prediction type when the mosaic residuals are used for encoding the macroblocks and as frame prediction type when the frame residuals are used for encoding the macroblocks.

10. A method according to claim 9 including classifying the frame prediction type macroblocks as foreground or background by comparing the global residuals with the frame residuals and classifying the mosaic prediction type as background.

11. A system for encoding an image, comprising:

a processor configured to derive frame residuals between macroblocks and the corresponding arrays in a first image, map macroblocks to portions of the first image according to global motion vectors and derive global residuals between the macroblocks and the mapped portions in the first image; and the processor further configured to classify the macroblocks as foreground or background by comparing the global residuals with the frame residuals.

12. A system according to claim 11 wherein the first image is associated with a first time reference and the macroblocks are extracted from a second image associated with a second time reference, the processor mapping the macroblocks with corresponding arrays in the first image according to macroblock local vectors and identifying the macroblocks as different frame prediction types according to particular types of local vectors used for mapping the macroblocks to the first image.

13. A method for automatically identifying objects in images, comprising:

deriving multiple local motion vectors mapping different subportions of macroblocks to subimage arrays in a first image;

deriving residuals by comparing the subportions of the macroblocks with the mapped subimage arrays;

identifying macroblocks as a submacroblock prediction types according to the derived residuals of the subportions of the macroblocks; and classifying the submacroblock prediction type macroblocks as foreground.

14. A method according to claim 13 including:

associating the first image with a first time reference;

extracting the macroblocks from a second image associated with a second time reference;

mapping the macroblocks with corresponding arrays in the first image according to macroblock local vectors;

deriving frame residuals between the macroblocks and the corresponding arrays in the first image; and identifying the macroblocks as different frame prediction types according to particular types of local vectors used for mapping the macroblocks to the first image.

* * * * *

UNITED STATES PATENT AND TRADEMARK OFFICE
CERTIFICATE OF CORRECTION

PATENT NO. : 6,751,350 B2
DATED : June 15, 2004
INVENTOR(S) : Crinon et al.

It is certified that error appears in the above-identified patent and that said Letters Patent is hereby corrected as shown below:

Column 5,
Line 42, "operator. w: Vector" should read -- operator. $\underline{w}$: Vector --.
Line 43, "vector w has" should read -- vector $\underline{w}$ has --.

Column 7,
Lines 19 and 21, "vectors R and r represent" should read -- vectors $\underline{R}$ and $\underline{r}$ represent --.

Column 9,
Line 24, "macroblocks Q around" should read -- macroblocks $\Omega$ around --.
Line 36, "map go is" should read -- map g() is --.
Line 54, "macroblock ((j,k) in" should read -- macroblock (j,k) in-.
Line 56, "time t, $S_s(R,t)$, is" should read -- time t, $S_s(\underline{R},t)$, is --.

Column 10,
Line 20, "$S_t(\underline{R},t)= W_f(S_t,(\underline{R}t-1),\underline{w})$" should read -- $S_t(\underline{R},t)= W_f(S_t(\underline{R}t-1),\underline{w})$ --.

Signed and Sealed this

Nineteenth Day of April, 2005

JON W. DUDAS
*Director of the United States Patent and Trademark Office*